United States Patent [19]
Turk

[11] Patent Number: 5,740,865
[45] Date of Patent: Apr. 21, 1998

[54] HORSESHOE

[76] Inventor: Nathan Turk, 600 Vineyard Ave., Highland, N.Y. 12528

[21] Appl. No.: 496,009

[22] Filed: Jun. 28, 1995

[51] Int. Cl.$^6$ .................................. A01L 1/04; A01L 7/06
[52] U.S. Cl. ........................................... 168/4; 168/42
[58] Field of Search ................................. 168/4, 22, 31, 168/35, 42

[56] References Cited

U.S. PATENT DOCUMENTS

| 189,692 | 4/1877 | Brightman | 168/35 |
| 292,302 | 1/1884 | Hall | 168/42 |
| 492,481 | 2/1893 | Crannell | 168/22 |

FOREIGN PATENT DOCUMENTS

| 4471 | of 1877 | United Kingdom | 168/31 |

*Primary Examiner*—Robert P. Swiatek
*Attorney, Agent, or Firm*—Martin J. Spellman, Jr.

[57] ABSTRACT

A horseshoe stock piece and various complementary pieces provide variety of custom features for horseshoes such as heel calk trailers, trailer calks, calk horseshoes and patent shoes. The stock piece is a horseshoe structure with conventional top or hoof surface, a bottom or ground surface, inner and outer faces, fullering on the ground side, and nail holes within the fullering. The heel end of each arm of the stock piece has a flat, rectangular recess formed in the ground surface face which is from 40%–60% of the depth or thickness of the shoe stock. A transverse groove is formed in the central portion of the recess. The groove has walls which are perpendicular to the surface of the groove and there is a threaded aperture formed in the base of the groove. The foregoing is dimensioned to receive a complementary piece secured in the recess. The complementary piece has a transverse extension or lug extending into the groove. A fastener passes through the complementary piece into the threaded aperture in the shoe structure. The structure allows a farrier to fabricate without forging an extensive variety of special shoe structures not otherwise readily available.

8 Claims, 6 Drawing Sheets

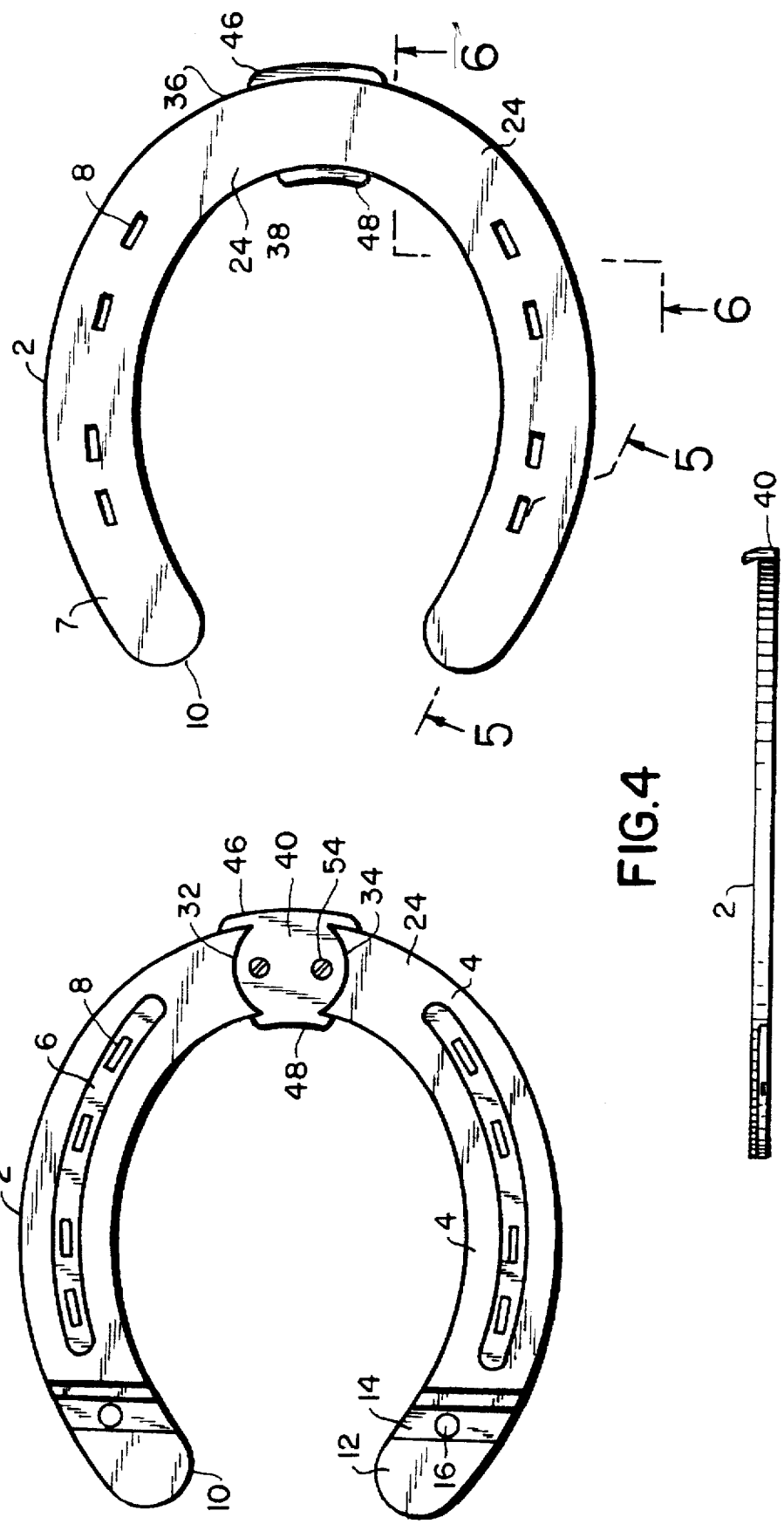

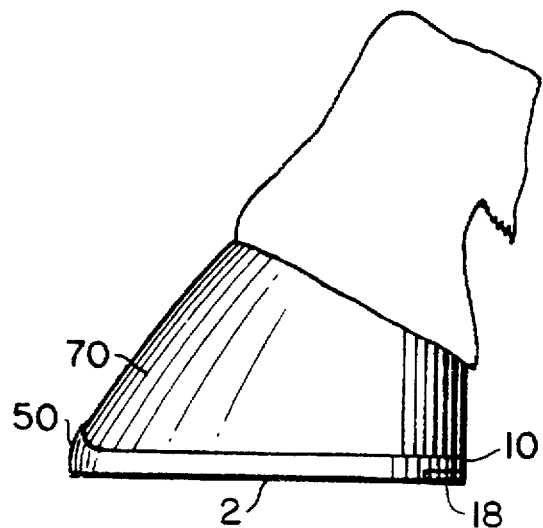
FIG.13
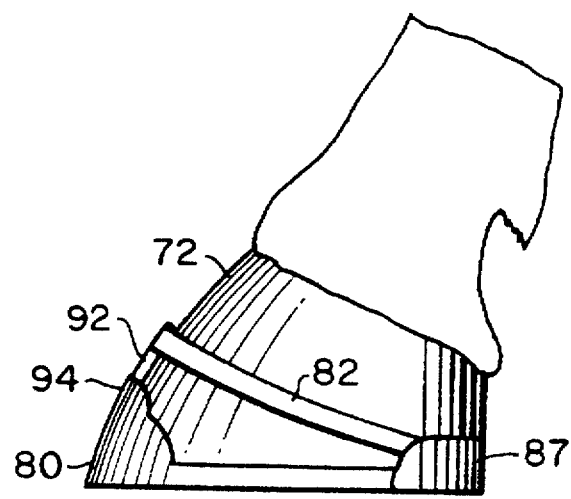
FIG.14
FIG.15
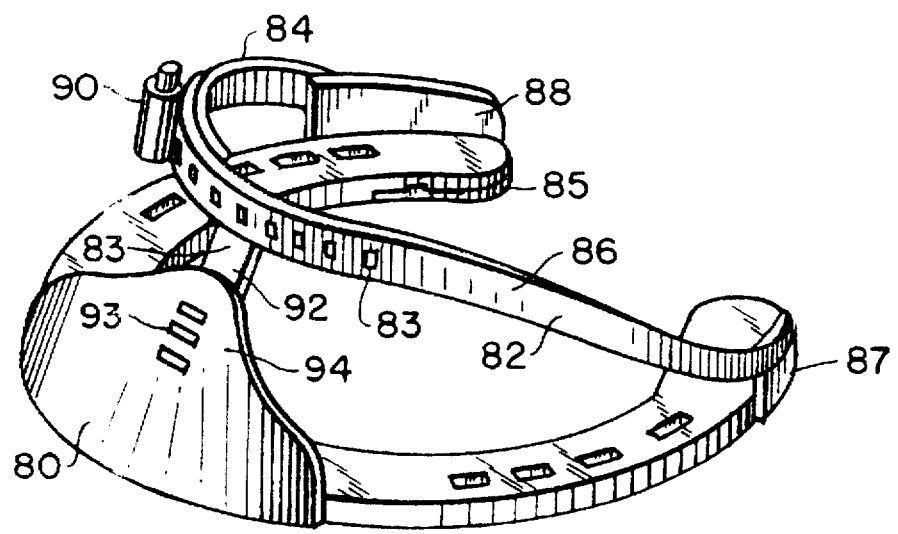

HORSESHOE

BACKGROUND OF THE INVENTION

1. Field of the Invention

The present invention is concerned with the field of farrier that is the art and science of horseshoeing.

The present invention is more particularly concerned with improving a basic horseshoe structure that is readily adaptable to a multitude of requirements for customized shoe structures and to provide such structures without the necessity of carrying a large stock of parts or the possession of great skill with a forge.

The present invention is an extension of the teaching of Wells, U.S. Pat. No. 5,421,415 and the teachings taken together make it possible to provide fully customized shoes within a short period of time without the use of a forge.

The farrier trade is one which in the past generally required a high degree of skill to custom-form shoes with use of a hot forge in cases where particular modifications required for running or working conditions or for correcting pathological conditions in the horse's hoof or legs or to obtain gait effects and the like.

In the past, if something other than a plain shoe was required, it necessitated that a farrier carry a large stock of different types of shoes with the attending inventory costs, transportation costs, economics of space, and the like.

If the farrier does not possess a high degree of skill in working the forge, an excess amount of time is required.

There has been a strong trend recently because of economics, to use more stock shoes because of the general decrease in the level of skill of farriers. The practice of cold shoeing horses has vastly expanded in recent years because of these factors.

The present invention greatly reduces the necessary inventory of the farrier.

It is an object of the present invention to provide a low cost and convenient method of providing custom features in horseshoes which may be formulated from a limited number of stock items and generally formed without resort to hot shoeing techniques.

These ends are achieved by providing a horseshoe stock piece in the usual number of sizes. The stock piece is readily adapted to form standard shoes, shoes with heel calks, toe calks, egg bar shoes, heart bar shoes and many other types of shoes to meet special running conditions and therapeutic needs of the animal involved.

It generally eliminates the need for a high degree of forge skill in building customized structures. The present invention is able to provide a method of forming such shoes, and applying the shoes rapidly at low cost without a high degree of skill being necessary and also drastically reducing forge time.

2. Prior Art

C. Weitman, U.S. Pat. No. 64,604 discloses a horseshoe having calks which may be added without changing the shoe. The calks are in the form of the U-shaped clip. One arm of the U is on the under surface of the shoe, the base of the U on the edge of the shoe, and a shorter arm extending over the top of the shoe. A screw passes through the lower surface arm into a predrilled hole in the shoe in order to secure the calk.

U.S. Pat. No. 4,386,660, Sparks, discloses a shoe having a permanent front calk and an elaborate pair of holding members intermediate the shoe for removablely securing the second calk position transversely to the longitudinal axis on the forward half of the shoe to improve turf gripping. The second calk does not extend downwardly as much as the front or toe calk. A very complex structure is involved.

U.S. Pat. No. 1,373,118, Douglas, discloses detachable calks which are simply secured to the bottom of the shoe by screw fasteners with intermediate padding devices between the calk and the shoe.

In U.S. Pat. No. 1,269,897, Baldwin & Swenson, detachable heel and toe calks are shown in which a threaded shank extends from the upper surface of the calk to be received in an appropriately threaded aperture located in the toe or the heel of the shoe. On a plate spaced from the threaded shank of the calk is an aperture in which a bolt is received to be threaded into another aperture in the lower surface of the shoe to prevent the shank from becoming unthreaded. These, in effect, are simply calks which are fastened onto the lower surface of the shoe by a pair of threaded fasteners.

U.S. Pat. No. 1,189,543, Covington, discloses a horseshoe having recesses or notches in the sidewall for securing detachable calks, each notch having one or more threaded apertures for receiving a threaded fastening means for securing the detachable calks. Rather elaborate slotted notches are provided in all of the embodiments.

U.S. Pat. No. 817,582, McGann, discloses a detachable heel bar calk for horseshoes which is secured by an elaborate threaded and wedge plate arrangement and does not have universal application.

The further patent to McGann, U.S. Pat. No. 817,583, is a related disclosure which includes rubber pads in the arrangement.

U.S. Pat. No. 944,666, Cox, discloses detachable heel and toe calks which are secured to the shoe by a threaded shank with a key lock and spaced therefrom in a plate parallel to the lower surface of the shoe is a threaded aperture through which passes a smaller diameter screw stud into a second hole in the shoe.

U.S. Pat. No. 991,211, Kieffer, discloses removable calks which are attached to the shoe by being wedged into transverse undercut grooves in the lower surface of the shoes and held in the grooves by passing through the caulk and a hole in the face of the groove passing through to the rear wall of the shoe and bolted.

U.S. Pat. No. 1,027,804, Billado, discloses a shoe having removable calks which are secured to the lower surface of the shoe by threaded bolt means passing through a horizontal flange of the calk into the lower surface of the side which has a threaded aperture(s) matching the threaded bolt. The heel portion of the shoe on the lower surface is provided with a V-shaped groove in which a corresponding lug at the upper end of the heel calk is received to minimize the loosening of the calk.

U.S. Pat. No. 1,075,34, Engstom & Bloom, discloses a shoe structure in which integral permanently fixed calks of the heel and toe are undercut on one side thereof to form a groove or recess for carrying a calk plate carrying a removable calk and the underside of the shoe has a threaded aperture to receive a threaded fastener such as a screw which passes through the calk plate into the shoe. The calk plate is retained by the threaded fastener and the undercut groove or recess.

SUMMARY OF THE INVENTION

Preferred modification structure includes that of U.S. Pat. No. 5,421,415 Wells.

The present invention provides a horseshoe stock piece and complementary pieces which are readily adaptable to multiple modifications to provide either standard horseshoe structures or an extensive variety of custom features such as shoes with heel calks, trailers, trailer calks, egg bar shoes, heart bar shoes, bar shoes, patton shoes, toe rings, hoof straps, and appliances for treating problems such as frog and navicular problems as in Wells U.S. Pat. No. 5,421,415.

The horseshoe piece of the present invention comprises a horseshoe structure having a conventional top or hoof surface, a bottom or ground surface, inner and outer faces, fullering on the ground side of the shoe and nail holes within the fullering. The heel end of each arm of said shoe structure has a generally flat rectangular recess formed in the ground surface face thereof. The recess is generally from 40% to 60% of the depth thickness of said shoe structure and has a transverse groove in the central portion of the recess. The groove has walls, which are generally perpendicular to the base surface of the groove. The recess and groove and threaded aperture are dimensioned to receive a complementary piece secured in said recess. The complementary piece has a transverse extension or lug which extends into said groove. A threaded fastener passes through the complementary piece into the threaded aperture in the shoe and secures the complementary piece to the shoe structure.

In accordance with the present invention the lower surface of the horseshoe is provided with the specially designed recess on the lower ground service of the shoe in the toe area. The upper surfaces of the recess have apertures which are threaded to receive screws from a correspondingly matched toe calk, clip or other assembly that can be secured to the shoe while still on the horse. The toe attachment base is of special design for stability and strengthening to provide adaptation for various configurations and attachments.

Among the attachments are wide toe rim shoes are invaluable for regular riding horses since they distribute hoof wall weight and takes the pressure of the nails.

The toe recess has side walls perpendicular to base of the shoe and is from 40 to 60% of the depth thickness of the stock shoes.

The recess opens to the outer and inner walls of the toe area of the shoe and the most importantly, the walls are generally concave with respect to the recess opening or on lines extending outwardly from the front and rear walls of the shoes.

Both the insert and upper surface of the recess are provided with threaded opening to recess a screw fastener to hold the complimentary piece to the shoe.

The toe clip is easily installed and it has lateral wings that lie against the front and rear walls of the shoe in the toe section. The pairs of wings are designed to saddle behind the front and rear wall surfaces of the front part of the shoe to shift the pull of the shoes on the nails. All inserts according to this invention will have the saddle behind the back of the shoe.

The present invention greatly reduces by up to fifty percent the number of stock shoes required to provide various custom shoe forms and eliminates the need for a high degree of forging skill to customize such items at the site of the shoeing operation.

In addition, these shoe forms may be assembled and completely applied to the animal in substantially less time than it previously took highly skilled farriers to prepare and form even one such shoe.

BRIEF DESCRIPTION OF THE DRAWING

In the accompanying drawing which forms a part of this specification:

FIG. 2 is a top plan view of the horseshoe in FIG. 1;

FIG. 3 is a bottom plan view of the horseshoe of FIG. 1;

FIG. 4 is a side elevational view thereof;

FIG. 13 is a side view of the shoe in FIG. 1 in place on horse's hoof;

FIG. 14 is a side view of a further alternative embodiment shown in place on horse's hoof; and FIG. 15 is a perspective view of the structure of the embodiment shown in FIG. 14.

ILLUSTRATIVE SPECIFIC EMBODIMENT

Figure 1:
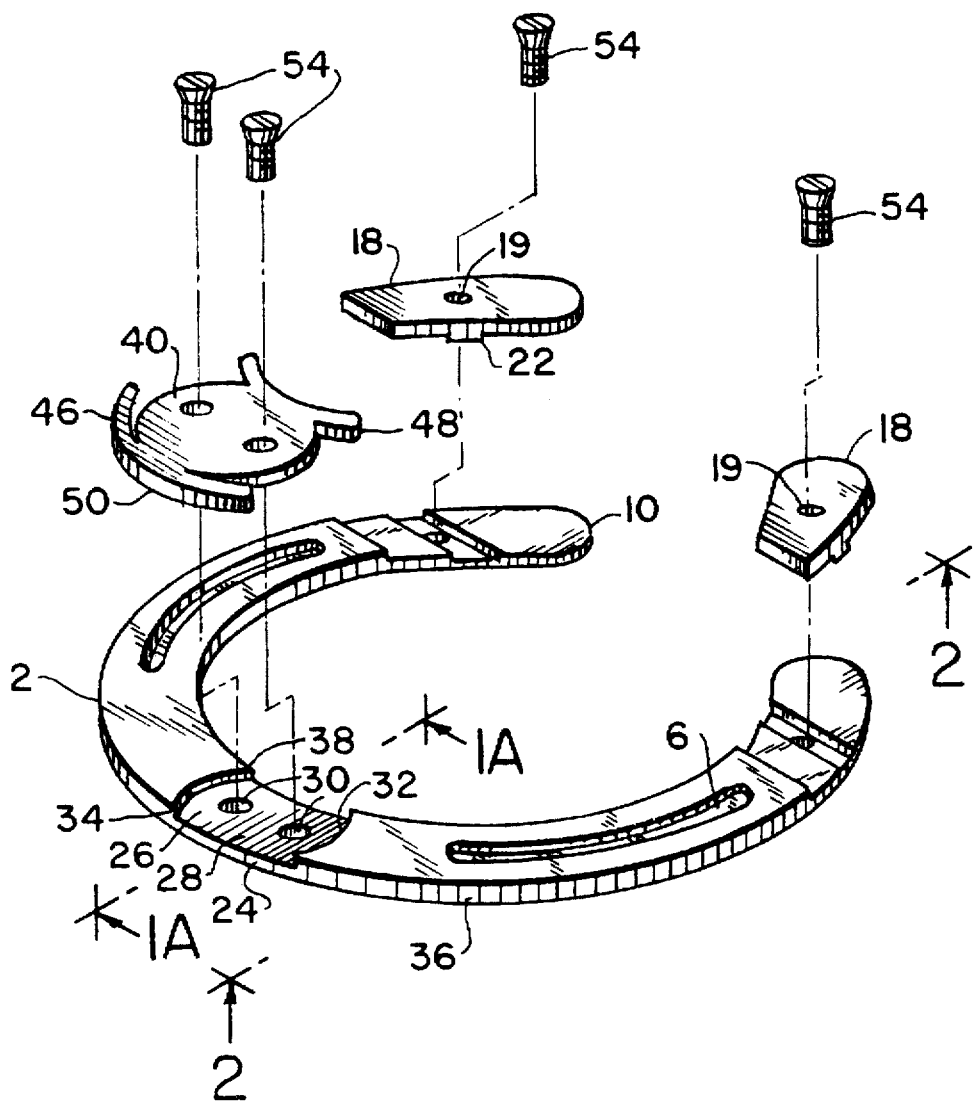
FIG. 1 is a perspective view of the improved horseshoe according to the present invention, showing the unique design of the toe section of the horseshoe, insertion piece therefor, and the heel design section.
Figure 1A:
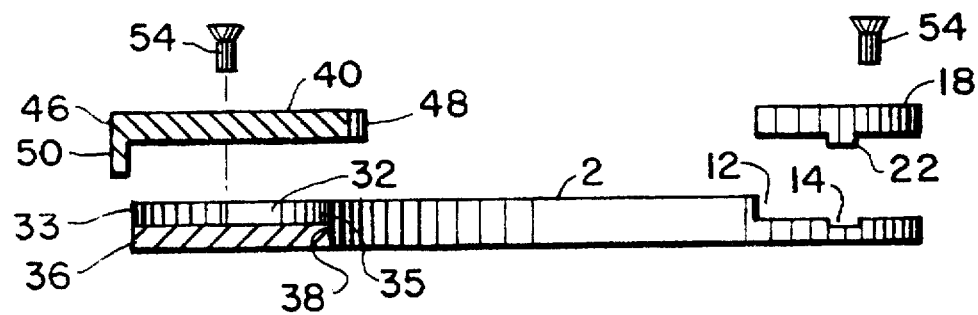
FIG. 1A is a sectional view along lines 1A—1A of FIG. 1.

In the accompanying drawing, a basic stock horseshoe piece structure of the present invention is indicated in FIGS. 1–7 generally by the numeral 2. The shoe 2 has lower or ground face at 4. Formed in the ground face 4 is fullering 6 having nail holes 8 through the shoe 2 as indicated. The hoof or top side of the shoe is indicated at 7. The heel ends 10 of the shoe 2 have a recess 12 of generally rectangular section which is approximately 40 to 60% of the thickness of the shoe 2 in depth. A transverse rectangular cross sectional groove 14 is formed in the face of recess 12, perpendicular to the longitudinal axis of the shoe 2 and has a threaded aperture 16 in the base or groove 14 of the recess 12.

Figure 5:
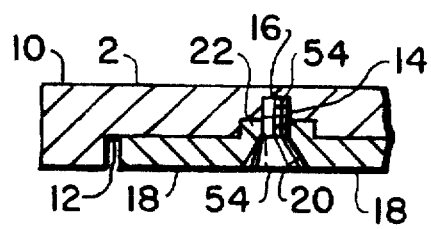
FIG. 5 is a sectional view along lines 5—5 of FIG. 2.
Figure 6:
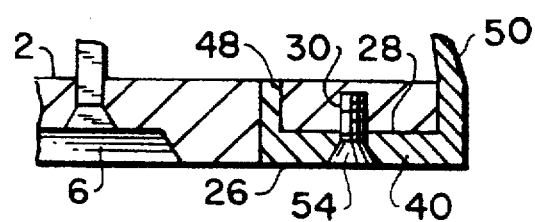
FIG. 6 is a sectional view along lines 6—6 of FIG. 2.
Figure 7:
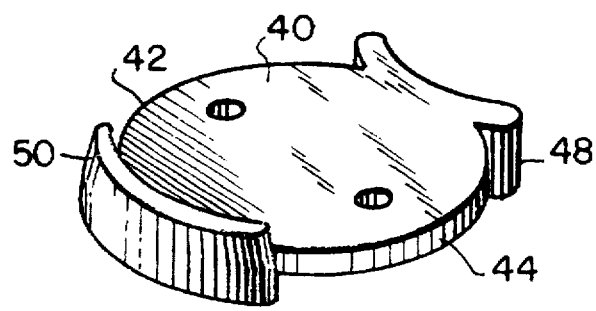
FIG. 7 is a perspective view of the toe piece utilized in foregoing embodiment.
Figure 8:
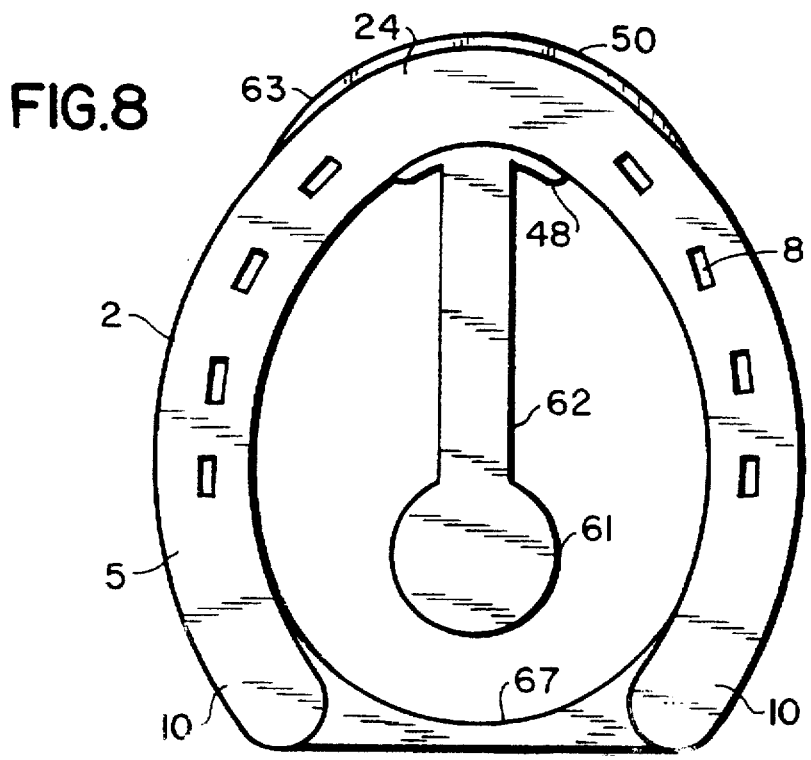
FIG. 8 is a top view of a horseshoe embodiment with a medical apparatus attached at the toe section for treating a navicular problem.
Figure 9:
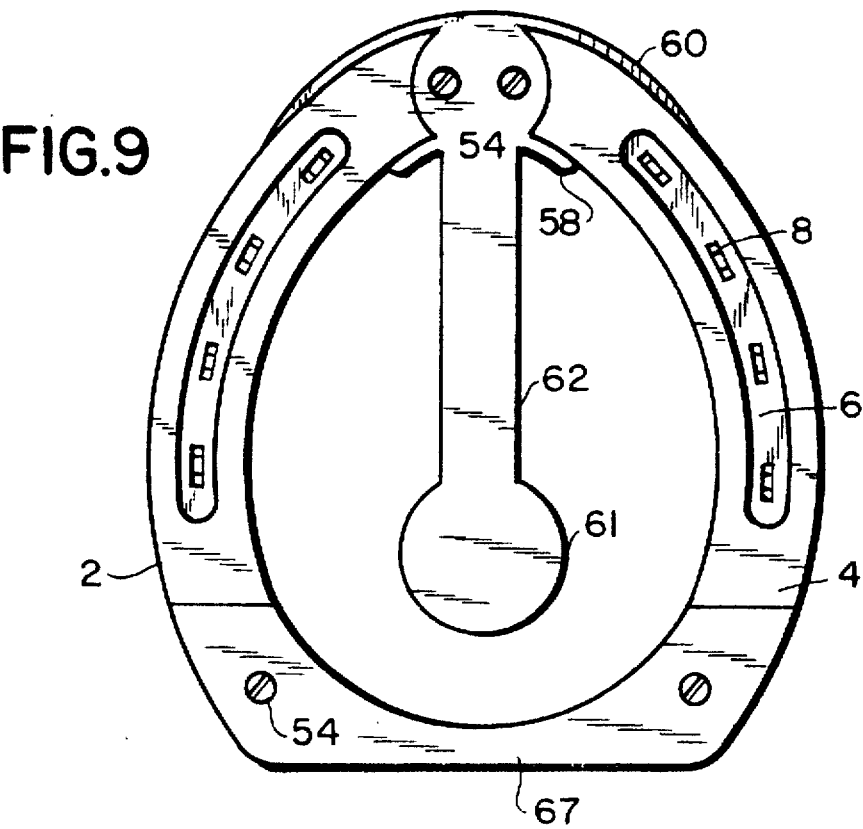
FIG. 9 is a bottom plan view of the horseshoe shown in FIG. 8.
Figure 10:
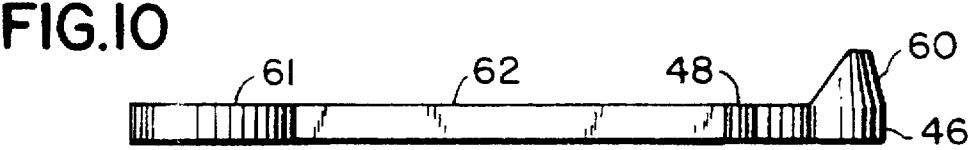
FIG. 10 is a side elevational view thereof.
Figure 11:
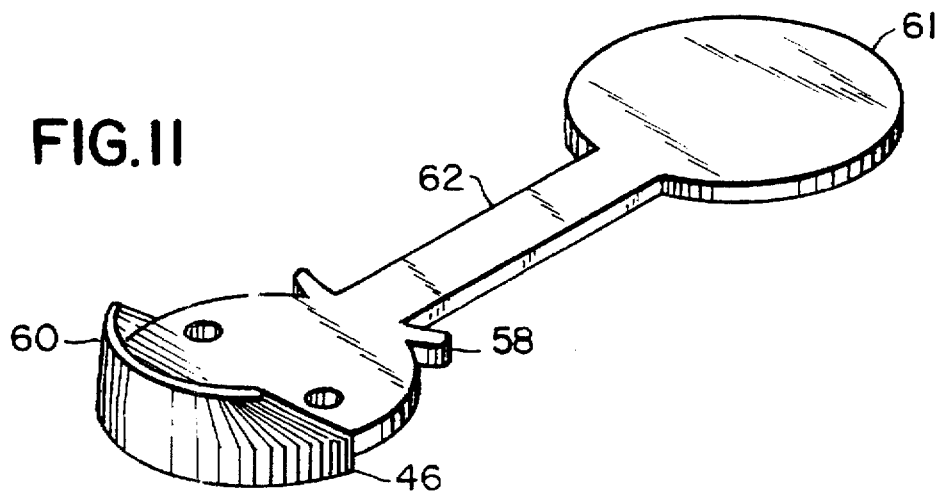
FIG. 11 is a perspective view of the toe piece of the foregoing FIGS. 8–10.

A complementary piece 18 has threaded openings 19 with countersink 20 as shown in FIG. 5. The thickness of the piece 18 is approximately the same as the depth of the recess 12 formed in each of the heels 10 of the shoe structure 2. Transverse lugs 22 on piece 18 are dimensioned to fit snugly into the grooves 14 in each recess 12. Screws 54 are threaded into apertures 19 in the piece 18 and then into threaded openings 16 of the heels 10, thus together with the congruence of the grooves 14 and lugs 22 holding the pieces 18 firmly in place. The resulting structure is a readily and quickly constructed plain horseshoe. Many different fixtures can be utilized in lieu of piece 18 to form calks, heel bars, heart bars, and other formats by simply adding appropriate parts to basic stock shoe piece in the manner of piece 18.

Toe section 24 has a recess 26 formed therein with the base 28 thereof having a pair of threaded apertures 30 therein, and sidewalls 32 and 34 to receive an insert 40 which includes toe clip 50. The recess 26 opens into the outer wall 36 and the interior wall 38 of the shoe 2 as shown at 33 and 35 respectively.

In the embodiment illustrated, side walls 32 and 34 bow laterally outward from the openings 33 and 35 in the front 36 and rear wall 38 of the shoe 2 respectively. The side walls 32 and 34 are thus formed as a pair of concave curved walls. The configuration of the walls 42 and 44 the insert 40 is significant to prevent forward and backward motion and twisting motion of the complementary insert 40 while in use.

They cooperate with corresponding walls 32 and 34 of recess 26. To provide additional strength and stability, wings 46 and 48 extend laterally from the front and back respectively of the insert 40 and are in congruence with the forward or outer wall 36 and rear or inner wall 38 of the horseshoe 2, as best shown in FIG. 2.

The complementary inserts 18 and 40 can be in the form of conventional toe calks, be optionally faced or coated with rubber for use in parades and made in the form of many other structures to provide a variety of shoe structures.

For example, an alternative embodiment of the device shown in FIGS. 8–12 is useful for treating hooves of horses with a navicular problem. In this case, the insert piece is a combination with a larger toe clip 60 and rearwardly extending arm 62 with rounded rear section 61 and with wings 58. The toe clip 60 extends around the sides 63 and 64 of the toe section 24 with the wings 58 over the outside of the front end of toe section 24 and the upper portion 66 extending in a canted manner over the front end of the hoof 70 shown in FIG. 12. A heel bar 67 with lugs 68 is also provided on the heel ends 10 of the shoe 2.

Figure 12:
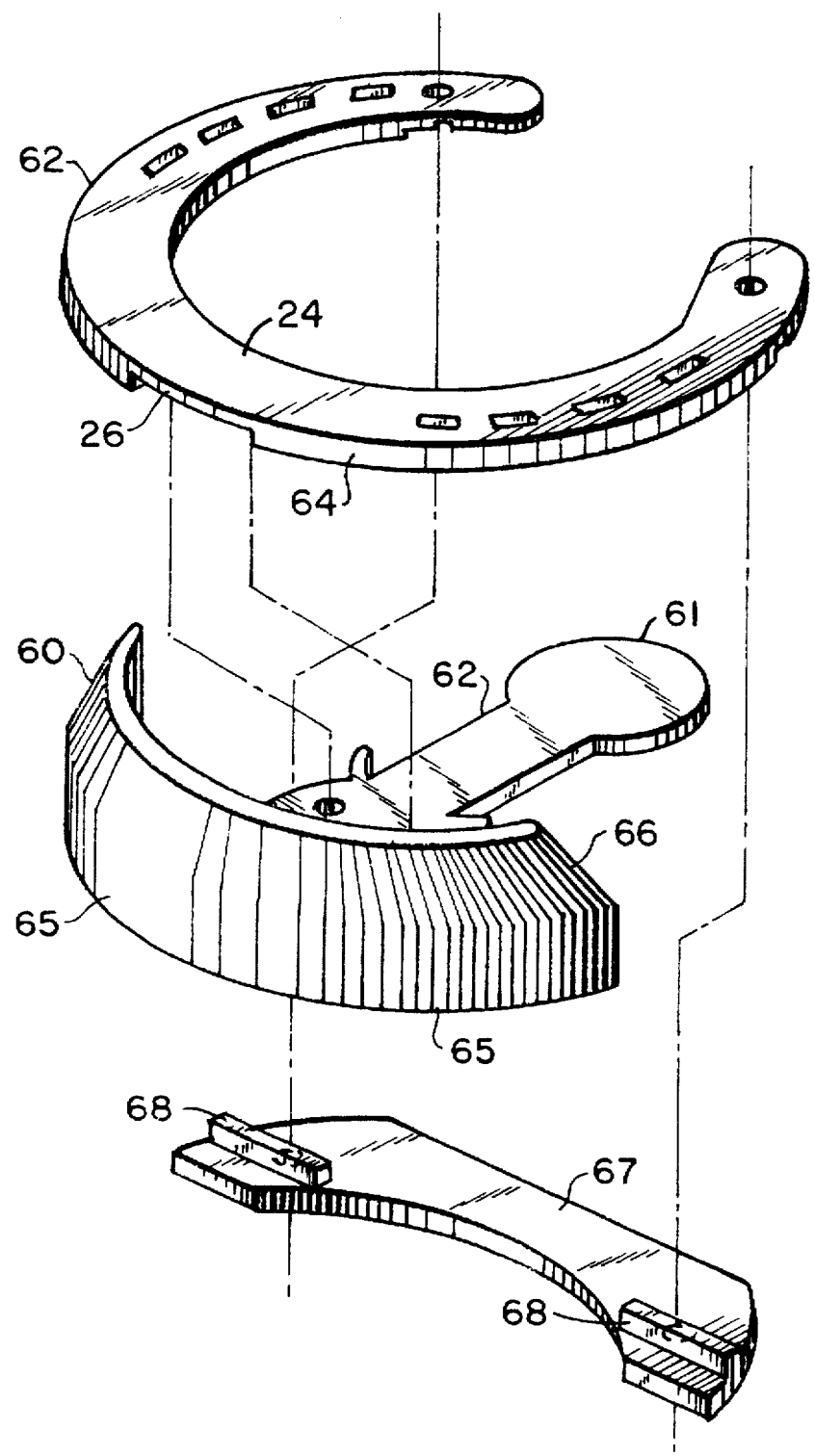
FIG. 12 is a perspective exploded view of the embodiment.

This piece is shown in an exploded view in FIG. 12 showing component parts as they fit together.

In FIG. 13 the shoe of the first embodiment is shown from the side installed on the horse's hoof 70.

An additional embodiment is illustrated on a horse's hoof 72 in FIG. 14 and a perspective view thereof is shown in FIG. 15. This comprises the toe clip 80 together with a hoof band 82 of two sections 84 and 86 overlapping and secured at ends to each other and to side walls 88 and 89 extending upwardly from the heel fixture 85 and 87. The bands 84 and 86 have an adjusting fixture 90 such that the two components 84 and 86 of the band 82 may be tightened together. A connecting strap 92 is adjustably secured to the top end 94 of the larger toe clip 80 which is attached to the shoe 2 in the same manner as in the foregoing embodiment and to the hoof band 82 at 83. This has proven to be very effective in treating horses with cracked or infected hooves.

Many other modifications are possible using the concepts of the present invention.

It is apparent that the elegance and simplicity of the specially designed shoe structure and complementary pieces of the present invention provide an extensive range of shoe structures that can be rapidly constructed form one base shoe structure by adding complementary pieces to form the final shoe structure.

The present invention greatly cuts inventory costs, space required for inventory and the cost of transportation. It also provides a means for providing a wide variety of shoe structures utilizing cold shoeing practice that does not require highly skilled forging personnel.

While the invention has been described by reference to illustrative embodiments, it is not intended that the novel device be limited thereby, but that modifications thereof are intended to be included as falling within the broad spirit and scope of the foregoing disclosure, the following claims and the appended drawings.

What is claimed is:

1. A horseshoe adaptable to multiple modifications, said horseshoe comprising a horseshoe stock piece having a conventional top hoof surface, a bottom ground surface and inner and outer faces, fullering in said ground surface of said horseshoe stock piece, nail holes through said piece within the fullering, a toe section, said toe section of said horseshoe stock piece having a generally flat recess in said bottom ground surface thereof, said recess running from the outer face to the inner face of said stock piece, said recess being from about 40% to about 60% the thickness of said shoe in depth, side walls of said recess generally perpendicular to a generally flat base surface of said recess, at least one threaded recess in said base surface of said recess, said recess being dimensioned to receive a complementary piece, said complementary piece having side walls shaped to form a congruent fit with said side walls of said recess, at least one aperture in said complementary piece to receive a threaded fastener to secure said piece to said stock piece, said complementary piece having lateral wings, which bear against the inner and outer faces of said stock piece in said toe section, and extend laterally of said recess, and said complementary piece when secured to said stock piece completing a desired horseshoe structure.

2. A horseshoe adaptable to multiple modifications, said horseshoe comprising a horseshoe stock piece having a conventional top hoof surface, a bottom ground surface and inner and outer faces, fullering in said ground surface of said horseshoe stock piece, nail holes through said piece within the fullering, a toe section, said toe section of said horseshoe stock piece having a generally flat recess in said bottom ground surface thereof, said recess running from the outer face to the inner face of said stock piece, said recess being from about 40% to about 60% the thickness of said shoe in depth, side walls of said recess generally perpendicular to a generally flat base surface of said recess, said walls of said recess each being concavely shaped with respect to said recess, at least one threaded recess in said base surface of said recess, said recess being dimensioned to receive a complementary piece, said complementary piece having side walls shaped to form a congruent fit with said side walls of said recess, at least one aperture in said complementary piece to receive a threaded fastener to secure said piece to said stock piece, said complementary piece having lateral wings, which bear against the inner and outer faces of said stock piece in said toe section, and extend laterally of said recess, and said complementary piece when secured to said stock piece completing a desired horseshoe structure.

3. A horseshoe as claimed in claim 2 wherein said complementary piece comprises a flat plate corresponding in depth and shape to said recess whereby when it is secured to said stock piece it forms a completed flat horseshoe.

4. A horseshoe as claimed in claim 2 wherein said complementary piece is shaped to provide a horseshoe with a toe calk when said piece is secured to said stock piece.

5. A horseshoe as claimed in claim 2 wherein said complementary piece is shaped to provide a toe rim clip for treating cracked and weak hoof walls.

6. A horse as claimed in claim 2 wherein the ground side of said complementary piece is coated with rubber.

7. A horseshoe as claimed in claim 2 wherein said complementary piece is shaped to provide a completed horseshoe wide rim toe clip and rearwardly extending bar from said toe area for treating navicular problems.

8. A horseshoe as claimed in claim 2 wherein said complementary piece comprises a large toe clip/length which is secured to an adjustable hoof strap, said strap secured at its ends to heels of said horseshoe stock piece.

* * * * *